(12) United States Patent
Nylander et al.

(10) Patent No.: US 8,320,300 B2
(45) Date of Patent: ***Nov. 27, 2012

(54) PACKET RADIO TRANSMISSION OVER AN UNLICENSED-RADIO ACCESS NETWORK

(75) Inventors: Tomas Nylander, Värmdö (SE); Jari Tapio Vikberg, Jaerna (SE); Hakan Niska, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1407 days.

This patent is subject to a terminal disclaimer.

(21) Appl. No.: 10/592,317

(22) PCT Filed: Mar. 9, 2004

(86) PCT No.: PCT/EP2004/002414
§ 371 (c)(1),
(2), (4) Date: Jul. 24, 2007

(87) PCT Pub. No.: WO2005/086430
PCT Pub. Date: Sep. 15, 2005

(65) Prior Publication Data
US 2007/0291750 A1 Dec. 20, 2007

(51) Int. Cl.
*H04W 4/00* (2009.01)
(52) U.S. Cl. ........ 370/328; 370/312; 455/423; 455/458; 455/426.1
(58) Field of Classification Search .................. 455/423, 455/458, 426.1; 370/312
See application file for complete search history.

(56) References Cited

U.S. PATENT DOCUMENTS

| 5,794,149 | A | 8/1998 | Hoo | |
| 6,061,337 | A | 5/2000 | Light et al. | |
| 6,144,709 | A | 11/2000 | Piirainen et al. | |
| 6,477,382 | B1* | 11/2002 | Mansfield et al. | 455/458 |
| 6,487,410 | B1 | 11/2002 | Kontio et al. | |
| 7,127,250 | B2 | 10/2006 | Gallagher et al. | |
| 2002/0019880 | A1 | 2/2002 | Sakakura | |
| 2002/0058504 | A1* | 5/2002 | Stanforth | 455/426 |
| 2002/0077097 | A1* | 6/2002 | Mizell et al. | 455/423 |
| 2002/0197984 | A1 | 12/2002 | Monin et al. | |

(Continued)

FOREIGN PATENT DOCUMENTS
EP    1 207 708    5/2002
(Continued)

OTHER PUBLICATIONS

International Search Report mailed Nov. 25, 2004.

(Continued)

*Primary Examiner* — Charles Shedrick
(74) *Attorney, Agent, or Firm* — Nixon & Vanderhye P.C.

(57) ABSTRACT

An unlicensed-radio access network is connected to a packet service node in a core network portion of a licensed mobile network. The unlicensed-radio access network includes an access controller connected to the core network portion and having a packet controller, a fixed broadband network connected to the access controller and having a plurality of access points. Each of the access points defines a mini-cell coverage area and supports an unlicensed-radio interface permitting communication of packet data between mobile stations located within a respective mini-cell and the access controller. The access controller comprises a database for storing the identification of mobile stations in association with packet path information addressing said mobile station on the fixed broadband network.

20 Claims, 4 Drawing Sheets

U.S. PATENT DOCUMENTS

| | | | |
|---|---|---|---|
| 2004/0146021 A1 | 7/2004 | Fors et al. | |
| 2004/0208151 A1 | 10/2004 | Haverinen et al. | |
| 2004/0209615 A1 | 10/2004 | Lamb et al. | |
| 2005/0075112 A1* | 4/2005 | Ball et al. | 455/456.1 |
| 2006/0019656 A1 | 1/2006 | Gallagher | |
| 2007/0184824 A1 | 8/2007 | Nylander | |
| 2007/0264996 A1 | 11/2007 | Vikberg et al. | |
| 2007/0281696 A1 | 12/2007 | Vikberg et al. | |
| 2008/0119187 A1 | 5/2008 | Gallagher et al. | |
| 2008/0242298 A1 | 10/2008 | Nylander et al. | |
| 2009/0303909 A1* | 12/2009 | Farhoudi et al. | 370/312 |

FOREIGN PATENT DOCUMENTS

| | | |
|---|---|---|
| EP | 1 207 708 A | 5/2002 |
| EP | 1 271 852 A2 | 1/2003 |
| EP | 1 351 530 A1 | 10/2003 |
| EP | 1 441 556 A | 7/2004 |
| GB | 2 313 257 A | 11/1997 |
| WO | WO 99/01002 A2 | 1/1999 |
| WO | WO 99/48312 A | 9/1999 |
| WO | WO 00/07402 A1 | 2/2000 |
| WO | WO 03/079706 A1 | 9/2003 |
| WO | 2004/002051 | 12/2003 |
| WO | 2004/002051 A | 12/2003 |
| WO | WO 03/101128 A | 12/2003 |
| WO | WO 2004/068768 | 8/2004 |

OTHER PUBLICATIONS

Mahmood H S et al.: "An Architecture for Integrating CDMA2000 and 802.11 WLAN Networks," Vehicular Technology Conference, Oct. 6, 2003, pp. 2073-2077.

International Search Report of PCT/EP2004/002414, mailed Nov. 25, 2004.

Mahmood et al., "An Architecture for Integrating CDMA and 802.11 WLAN Networks", Vehicular Technology Conference; 2003, VTC 2003-Fall, 2003 IEEE 58$^{th}$ Orlando FL, Oct. 6-9, 2003, pp. 2073-2077, XP010701282.

U.S. Appl. No. 10/588,658, filed Jun. 12, 2007; Inventor: Vikberg et al.

U.S. Appl. No. 10/589,873, filed Jun. 13, 2007; Inventor: Nylander et al.

U.S. Appl. No. 10/591,953, filed Sep. 8, 2006; Inventor: Nylander et al.

U.S. Appl. No. 11/547,013, filed Oct. 2, 2006; Inventor: Vikberg et al.

Office Action mailed Feb. 19, 2009 in co-pending U.S. Appl. No. 10/588,658.

Office Action mailed Jul. 31, 2009 in co-pending U.S. Appl. No. 10/588,658.

Office Action mailed Jun. 22, 2010 in co-pending U.S. Appl. No. 10/589,873.

Office Action mailed Apr. 9, 2008 in co-pending U.S. Appl. No. 10/591,953.

Office Action mailed Sep. 16, 2008 in co-pending U.S. Appl. No. 10/591,953.

Office Action mailed May 27, 2009 in co-pending U.S. Appl. No. 10/591,953.

Office Action mailed Feb. 4, 2010 in co-pending U.S. Appl. No. 10/591,953.

Office Action mailed Aug. 3, 2010 in co-penidng U.S. Appl. No. 11/547,013.

International Search Report of PCT/EP2004/001539, mailed Oct. 12, 2004.

International Search Report of PCT/EP2004/001115 mailed Nov. 9, 2004.

International Search Report of PCT/EP2004/003367 mailed Nov. 25, 2004.

International Search Report of PCT/EP2004/002357 mailed Nov. 9, 2004.

* cited by examiner

PACKET RADIO TRANSMISSION OVER AN UNLICENSED-RADIO ACCESS NETWORK

TECHNICAL FIELD

The technical field to packet radio service transmissions via an unlicensed radio access network. It has specific relevance to the handling of identification of mobile stations for packet radio data in an unlicensed radio access network.

BACKGROUND

In the packet service (Global Packet Radio Service) in a GSM cellular network packets (logical link control or LLC frames) are exchanged between a mobile station MS and GPRS support nodes SGSN in the core network, both of which have the corresponding protocol layers. This exchange is handled by a processor called the packet control unit PCU, which is part of a conventional base station subsystem BSS.

Mobile stations communicating with the General Packet Radio Service (GPRS) of a GSM cellular network are assigned a mobile identity, called the Packet Temporary Mobile Subscriber Identity (P-TMSI). This P-TMSI is used on the GPRS Mobility Management layer (GMM). Any single mobile station can have several different types of P-TMSI, some of which are allocated by the network, for example by a GPRS Support Node (SGSN), during GPRS attach, Routing Area update or P-TMSI reallocation procedures. The GMM protocol layer also assigns a Tempory Logical Link Identity (TLLI) which is derived from the P-TMSI for use by the lower layers, such as the Logical Link control layer (LLC) and the Radio Link Control and Medium Access Control layers (RLC/MAC).

Figure 1:
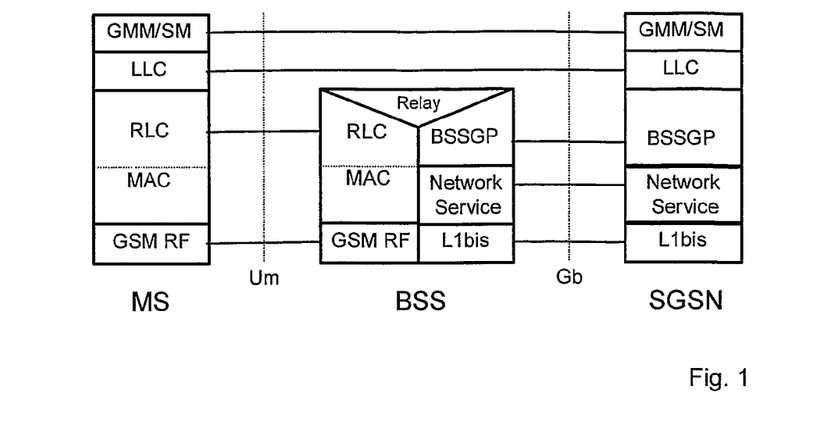
FIG. 1 schematically depicts the signalling plane between a mobile station and GPRS support node in the conventional GSM GPRS network, FIG. 2 schematically depicts parts of a GSM network modified to include an unlicensed-radio access network, FIG. 3 schematically depicts the unlicensed-radio access network.
Figure 2:
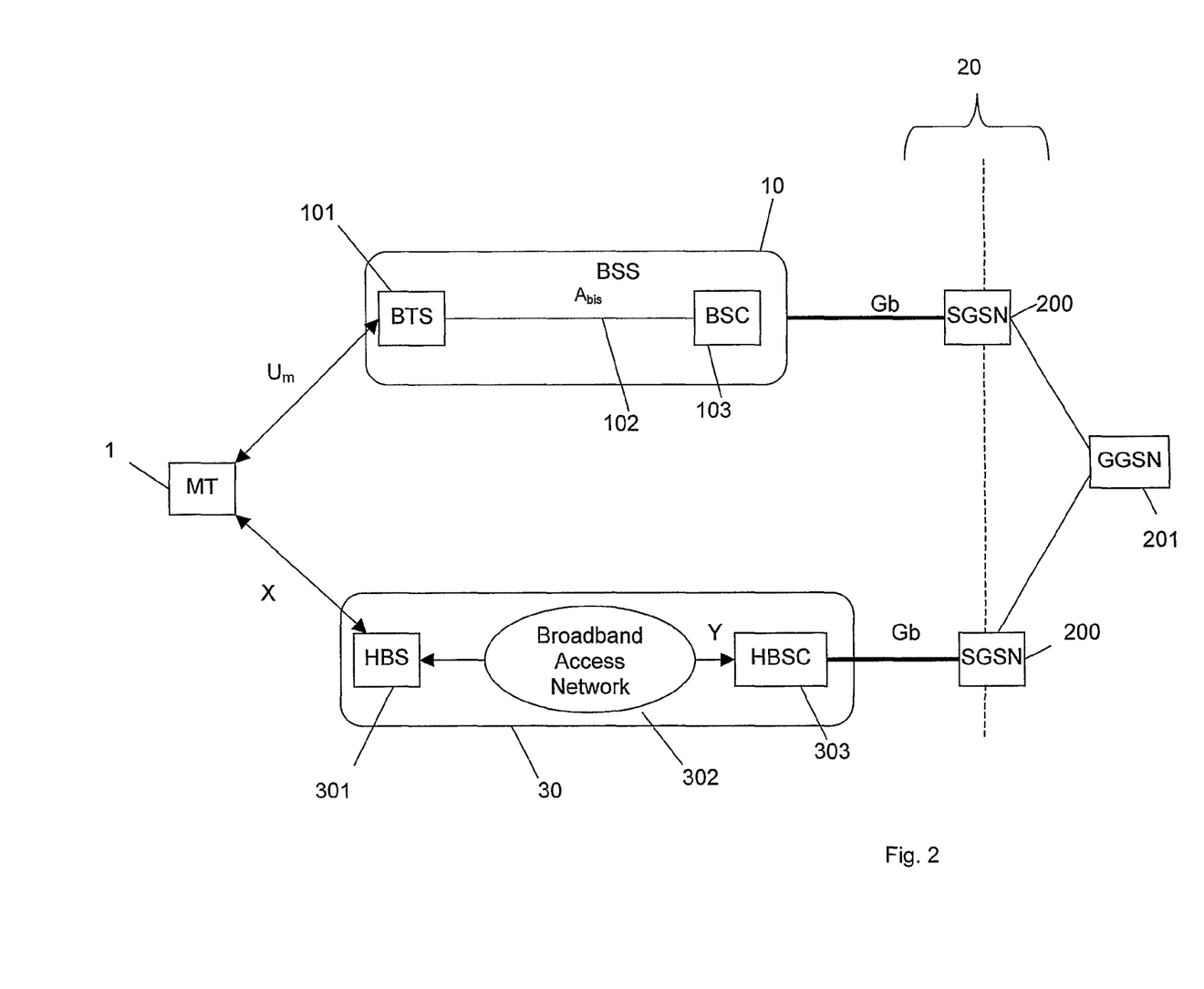

FIG. 1 illustrates the GPRS signalling plane for a mobile station MS, base station subsystem BSS and GPRS support node SGSN corresponding to GSM 03.60. At the top of the illustrated protocol stack both the mobile station MS and the GPRS support node SGSN have peer GPRS mobility management/session management GMM/SM protocol and logical link control protocol layers. The GMM/SM and LLC protocol messages are relayed by the base station subsystem, which does not have an equivalent protocol layer. On the Um interface between the mobile station and the base station subsystem Radio link control RLC and medium access control MAC protocol layers are present over the GSM radio frequency RF protocol layers. Across the Gb interface between the base station subsystem and the GPRS support node SGSN the base station subsystem GPRS protocol BSSGP is supported above the network service protocol and the layer 1 protocols.

This temporary logical link identity TLLI is one of the main addressing components for the exchange of packets between a mobile station and the core network in addition to a base station subsystem packet layer BSSGP virtual circuit identifier, referred to as the BVCI. Every packet between the mobile station and the core network will include the TLLI in a header.

While the packet control unit PCU uses the temporary logical link identity TLLI to assign packets to correct temporary block flows TBF and to direct packets to the corresponding mobile station, the packet control unit PCU has no previous knowledge of this identifier. The mobile station includes its assigned TLLI in uplink messages. The core network also transmits the TLLI if it has data to send but the mobile station is in idle mode, i.e. no TBF exists.

When LLC frames are sent from a mobile station to the core network the packet control unit PCU identifies the temporary logical link identifier TLLI when an uplink temporary block flow (TBF) is established.

For LLC frames sent to the mobile station, the packet control unit PCU directs the LLC frames to one particular cell (BVC), and uses the established downlink temporary block flow (TBF) if this is available. If no downlink temporary block flow is available the packet control unit PCU can assign the mobile station to a downlink temporary block flow using the temporary logical link identifier TLLI.

The TLLI is essentially a temporary telephone number that is used when the mobile station is in a specific routing area. A TLLI is valid for as long as a mobile station remains in a Routing Area, which comprises several cells. The GMM protocol layer in the mobile station informs the network of the location of the mobile station.

When a mobile station is not active in a packet transfer, the GMM protocol layer is in a standby state, called GMM-STANDBY. In this state, the GMM protocol layer of the mobile station notifies the core network when the mobile station crosses from one routing area into another with a Routing Area Update. Any messages that need to be sent by the core network to the mobile station while the mobile is in this state will require that the mobile station be paged in all cells belonging to its current Routing Area. When the mobile station sends an uplink data packet (LLC-PDU) to the cores network, it enters the GMM-READY state. When the mobile station is in GMM-READY state, i.e. is active in packet mode transfer, the GMM layer notifies the network whenever a cell border is crossed, by performing cell updates. In this state, the exact location of the mobile station is known on cell level; any packets transmitted to this mobile station by the core network can thus be sent directly to the mobile station via the correct base station subsystem (BSS). A mobile station remains in the GMM-READY state for a set period of time after sending an uplink LLC packet. A timer, called the READY-STATE TIMER is used to count down this period and is reset with each uplink LLC packet sent. The cell update message does not reset the timer. The timer value is coordinated between the mobile station and the GPRS support node SGSN during the GPRS attach and Routing Area Update procedures. The GMM states thus exist in both the mobile station and the GPRS support node SGSN to which it is connected.

Recently proposals have been made to extend conventional cellular networks by including access networks that utilise a low power unlicensed-radio interface to communicate with mobile stations. The access networks are designed to be used together with the core elements of a standard public mobile network and consist essentially of plug-in low-power unlicensed radio transceivers, or access points, each designed to establish an unlicensed radio link with a mobile station MS and a controller or interface node connecting the unlicensed radio transceivers with the mobile core network. The connection between the controller and the access points is a fixed broadband network. Suitable unlicensed-radio formats include digital enhanced cordless telecommunications (DECT), wireless LAN and Bluetooth. An adapted mobile handset capable of operating over both the standard air interface (e.g. the Um interface) and the unlicensed-radio interface means that the subscriber requires only one mobile station for all environments. The access network should be constructed in such a way that the core elements of the public mobile network view the interface node as a conventional base station controller BSC. In other words, the interface between the access network and the core network follows 3GPP specifications.

However, the combination of the small size of the access point coverage areas and the ease with which these can be installed and moved means that each access controller will be controlling a very large but frequently changing number of cells compared to the equivalent base station controller of a conventional cellular network. Moreover, mobile stations served by an unlicensed-radio access network are connected to the access network by at least one dedicated control connection, typically a static TCP connection over the broadband network connecting the access controller to the access points. The conventional mechanisms for routing packet service data between the mobile station and the core network are thus not useful in this access network for reasons of scale and signalling load.

SUMMARY

In the light of the above problems it is an object to provide an unlicensed-radio access network capable of handling packet service traffic without undue signalling load.

This and further objects are achieved in an unlicensed-radio access network and method carried out in the same in accordance with the appended claims.

Specifically the unlicensed-radio access network is connected to a packet service node in a core network portion of a licensed mobile network. The unlicensed-radio access network includes an access controller connected to the core network portion and having a packet controller, a fixed broadband network connected to the access controller and having a plurality of access points. Each of the access points defines a mini-cell coverage area and supports an unlicensed-radio interface permitting communication of packet data between mobile stations located within a respective mini-cell and the access controller. The access controller comprises a database for storing the identification of mobile stations in association with packet path information addressing said mobile station on the fixed broadband network.

The provision of a database for associating the temporary identification of the mobile station with a broadband network address or the access point via which the mobile station communicates with the access network essentially provides an intermediate level of mobility management. In this way the access network can actively direct messages from the core network towards a specific address, access point or group of access points to reduce the amount of signalling to and from the access points.

The access points may either comprise separate entities capable of establishing a connection with the access controller even when no mobile station is located in its coverage area, or they may be essentially transparent access points or nodes to the broadband network that simply relay messages between a mobile station and the access controller while providing the conversion between the unlicensed-radio interface and the fixed broadband network. In this latter case, the mobile stations will be assigned a network address on the broadband network, since the access points are not recognised as separate entities by the access controller.

In accordance with an example embodiment, the database is updated without the involvement of the core network.

DETAILED DESCRIPTION OF THE DRAWINGS

The cellular mobile network depicted in FIG. 1 includes parts of a conventional GSM network that supports the General Packet Radio Service GPRS. This network is essentially divided into a core network portion 20 and an access portion 10. The elements of the core network illustrated in the figure include the GPRS support nodes SGSN 200, which may have access to one or more external networks 30, such as ISDN and PSTN networks and packet and circuit switched packet data networks such as intranets, extranets and the Internet via one or more gateway GPRS support nodes GGSN 201. The function and structure of these conventional GSM architecture elements are known to those in the art and will not be described in further detail here.

The access portion essentially consists of base station subsystems BSS 10, one of which is illustrated in FIG. 1, which communicate via a defined fixed standard Gb interface with a SGSN 200 in the core network portion 20. Each base station subsystem BSS 10 includes a base station controller BSC 103 which communicates with one or more base transceiver stations BTS 101 via the defined $A_{bis}$ air interface 102. The base transceiver stations 101 communicate with mobile stations MS 1 over the GSM standard $U_m$ radio air interface. It will be understood that while the BTS 101 and BSC 103 are depicted as forming a single entity in the BSS 10, the BSC 103 is often separate from the BTSs 101 and may even be located at the mobile services switching centre MSC 202.

In addition to the standard access network portion provided by the BSS's 10 the network depicted in FIG. 1 further includes a modified access network portion 30 shown in the lower half of the figure. Hereinafter this will be described as an unlicensed-radio access network portion 30.

The components making up this unlicensed-radio access network portion 30 also enable the mobile terminal 1 to access the GSM core network portion, and through this, other communication networks via an unlicensed-radio interface X, represented in FIG. 1 by the bi-directional arrow. By unlicensed-radio is meant any radio protocol that does not require the operator running the mobile network to have obtained a license from the appropriate regulatory body. In general, such unlicensed-radio technologies must be low power and thus of limited range compared to licensed mobile radio services. This means that the battery lifetime of mobile terminals will be greater. Moreover, because the range is low the unlicensed-radio may be a broadband radio, thus providing improved voice quality. The radio interface may utilise any suitable unlicensed-radio protocol, for example a wireless LAN protocol or Digital Enhanced Cordless Telecommunications (DECT). Preferably, however, Bluetooth radio is utilised, which has a high bandwidth and lower power consumption than conventional public mobile network radio.

The Bluetooth standard specifies a two-way digital radio link for short-range connections between different devices. Devices are equipped with a transceiver that transmits and receives in a frequency band around 2.45 GHz. This band is available globally with some variation of bandwidth depending on the country. In addition to data, up to three voice channels are available. Each device has a unique 48-bit address from the IEEE 802 standard. Built-in encryption and verification is also available.

The unlicensed-radio access network portion 30 shown in FIG. 1 includes an access network controller 303 also designated a home base station controller HBSC. The home base station controller HBSC 303 communicates with a serving GPRS support node SGSN 203 over a standard Gb interface in the core network portion and provides the connection between the SGSN 203 and mobile terminal 1. The home base station controller HBSC 303 is connected to a plurality of unlicensed radio access points 301, which will be referred to as home base stations HBS by a fixed broadband packet-switched network 302. The home base stations HBS 301 are adapted to communicate across the Bluetooth interface and to this end handle the radio link protocols with the mobile terminal MS 1 contain radio transceivers that define a cell in a similar manner to the operation of a conventional GSM base station transceiver BTS 101. The joint function of the home base station HBS 301 and the home base station controller HBSC 303 emulates the operation of a conventional BSS 10 towards the SGSN 201. In other words, when viewed from the elements of the core network 20 such as the serving GPRS support node (SGSN) 201, the fixed access network portion 30 constituted by the home base stations HBS 301 and the home base station controller HBSC 303 looks like a conventional access network portion 10.

The applications that run on the mobile terminal MS 1 on top of the public mobile network radio interfaces also run on top of Bluetooth radio between the mobile terminal 1 and the home base station HBS 301.

The home base station 301 is intended to be a small device that a subscriber can purchase and install in a desired location such as the home or an office environment to obtain a fixed access to the mobile network. However, they could also be installed by operators in traffic hotspots. In order to reduce the installation costs on the part of the operator, the interface between the home base station 301 and the home base station controller 303 therefore preferably exploits an already existing connection provided by the fixed network 302. Suitable networks might include those based on ADSL, Ethernet, LMDS, or the like. Home connections to such networks are increasingly available to subscribers. Although not shown in FIG. 1, the home base station HBS 301 will be connected to a network terminal giving access to the fixed network 302, while the home base station controller HBSC 303 may be connected to an edge router ER of the network 302 that also links the fixed network 302 to other networks such as intranets and the internet. IP is used for communication between the home base station HBS 301 and home base station controller HBSC 303 over the fixed network 302 to render the transport of data independent of the network type. The link between the home base station HBS 301 and the home base station controller HBSC 303 is preferably always open, so that this connection is always available without the need for reserving a channel.

The home base station HBS 301 is installed by plugging it in to a port of a suitable modem, such as an ADSL or CATV modem, to access the fixed network 302. The port is in contact with an intranet that is either bridged or routed on the IP level. In accordance with a first embodiment the home base station HBS 301 connected to the modem utilises standard protocols, such as IP, DHCP, DNS to establish a connection with a home base station controller HBSC 303. A sign-on procedure for a home base station 301 connecting for the first time or reconnecting to a home base station controller HBSC 303 is for example described in European patent application No. EP-A-1 207 708. Prior to establishing a voice or data connection between the home base station controller HBSC 303 and a home base station HBS 301 a static TCP connection is established between these elements across the fixed broadband network 302.

In accordance with an alternative embodiment, the home base station 301 is not recognised as a separate entity by the home base station controller 303 but simply serves as an unlicensed-radio access point to the access network and relays packets received over the unlicensed-radio interface to the IP based network 203 and vice versa. In this embodiment, the mobile station MS is provided with the necessary functionality to establish and maintain a static connection with a home base station controller HBSC 303 over the broadband network 302. When the home base station HBS 301 is simply a transparent access point to the unlicensed-radio access network, it does not communicate with the home base station controller HBSC 303 independently of a mobile station and accordingly there is no sign-on procedure.

Figure 4:
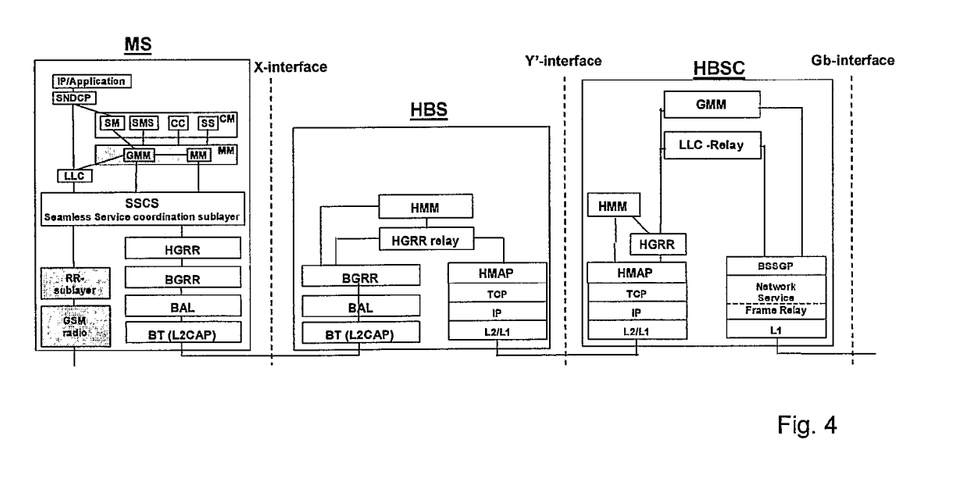
FIG. 4 illustrates the signalling plane between a mobile station and home base station controller in an unlicensed-radio access network in accordance with a first non-limiting, example embodiment.
Figure 5:
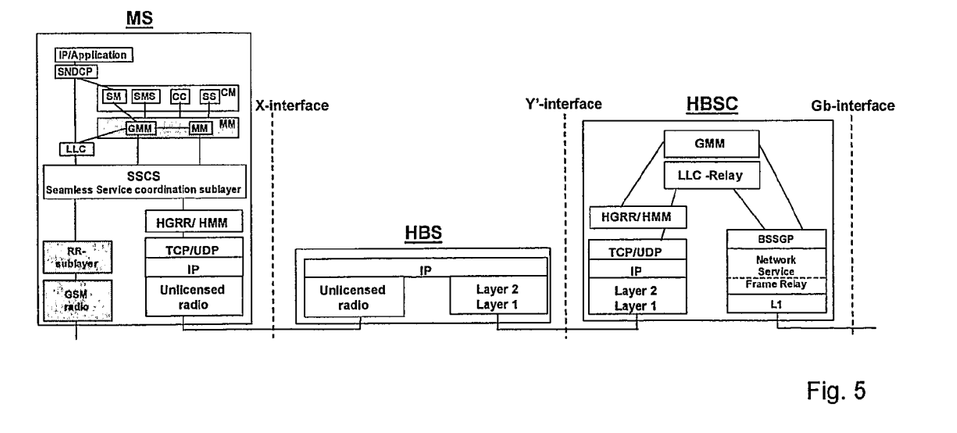
FIG. 5 illustrates the signalling plane between a mobile station and home base station controller in an unlicensed-radio access network in accordance with a second non-limiting, example embodiment.

The signalling planes of unlicensed radio access networks in accordance with these two embodiments are illustrated in FIGS. 4 and 5. In both embodiments, the mobile station has two parallel protocol stacks. For handling communication over the conventional GSM radio interface the mobile station has a GSM radio layer below a radio resource RR-sublayer. Above this is a service coordination sublayer SSCS which also connects to the unlicensed-radio sublayers. Above the service coordination sublayer SSCS is the logical link control layer, the mobility management layer for handling circuit switched and GPRS mobility management (MM and GMM) and the connection management CM layer with the GPRS session management SM, short message service, SMS and equivalent protocols for circuit-switched traffic. Above this is the sub-network dependent convergence protocol SNDCP and the IP application layer. The unlicensed radio interface, which in the present example uses Bluetooth, is supported by different protocol layers in the two different embodiments. In FIG. 4 a Bluetooth radio layer BT is provided below a Bluetooth adaptation layer BAL and a Bluetooth GPRS radio resources layer BGRR. In addition to these new radio resource protocols a further new protocol layer, the Home GPRS radio resource layer HGRR, is supported. The HGRR protocol essentially replaces the Radio Link Control RLC protocol layer in a conventional GSM access network. In the home base station the HBS Bluetooth radio layer BT, Bluetooth adaptation layer BAL and Bluetooth GPRS radio resources layer BGRR are provided. The home base station also includes a Home GPRS radio resource layer HGRR for relaying HGRR messages between the home base station controller and the mobile station MS. A home mobility management layer HMM is likewise present for partially relaying mobility management protocol messages. The broadband access or Y interface is supported by a home mobile application part protocol above TCP over IP. OSI Layer 1 and 2 protocols are below the IP protocol layer. At the home base station controller these protocol layers are replicated. Above these the logical link control protocol and GPRS mobility management messages are relayed. The Gb interface is supported by the same protocol layers present in a conventional BSS as described with reference to FIG. 1.

In FIG. 5, the X-interface protocol layers in the mobile station consist of the unlicensed radio lower layers. Above these are provided an IP and TCP/UDP protocol layer. The home GPRS radio resource HGRR protocol layer is also provided at this interface in addition to the home mobility management HMM protocol layer. In the home base station HBS serving as a transparent access point the X-interface is supported by the unlicensed radio protocol under IP. The Y-interface is supported in the home base station HBS only be the OSI Layer 1 and 2 protocols under IP. The protocol layers supporting the Y-interface at the home base station controller HBSC are essentially the same as those shown in FIG. 4.

Mobile stations served by the unlicensed-radio access network are registered in this access network and connected to the access network with at least one dedicated control connection. This may be a static TCP connection established over the fixed broadband network, or other maintained static connection based on UDP, for example. This connection is maintained even when the mobile station is in an idle state.

Figure 3:
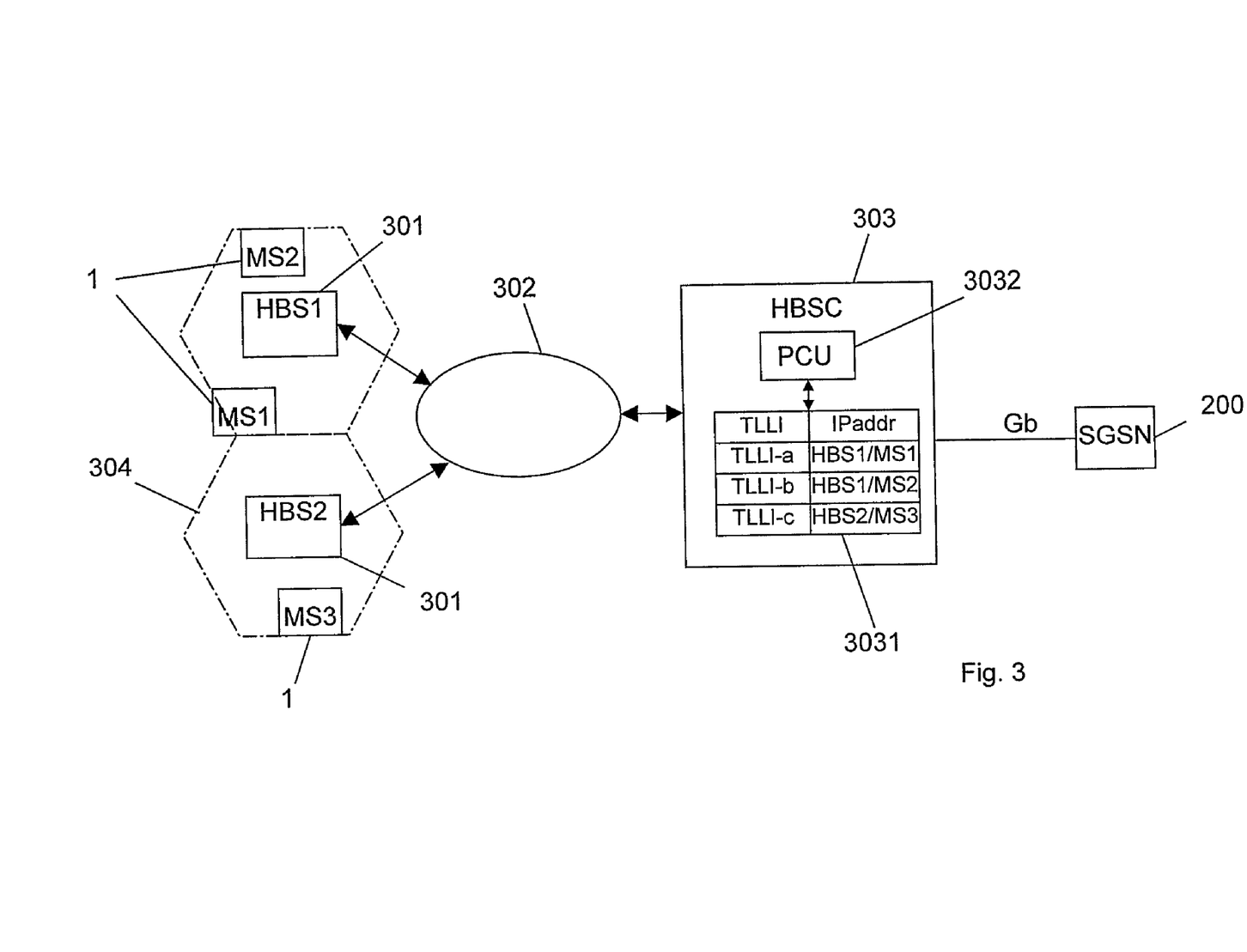

In a conventional GSM access network LLC-frames received from the core network when a mobile station is in the GMM-STANDBY state, i.e. is not active in packet mode transfer, cannot be directed to the mobile station, since the location of the mobile station is known only on a Location Area level. In order to ensure that the message reaches the addressed mobile station, therefore, it is sent to all BSS coverage areas, or cells, within the same Routing Area as the mobile station. In an unlicensed-radio access network, a single home base station controller will control at least one Routing Area. The small size of the cells in the unlicensed-radio access network large means that potentially many more home base stations, or access points will be assigned to a single Routing Area. Transmitting LLC frames between the home base station controller HBSC 303 and all home base stations within a Routing Area would result in a prohibitively heavy signalling load on the access network. This problem can be alleviated by providing a lookup table or database accessible to the home base station controller for storing routing information that can be accessed with a mobile station identifier, typically the International Mobile Subscriber Identity IMSI. The IMSI is known by the core network and is typically used in the exchange of both circuit switched (i.e. voice) and packet switched traffic. However, such a database will be very large as it will contain entries for every mobile station located in the coverage area of the unlicensed-radio access network, whether these are idle or active. This will result in a prohibitively high signalling load when a mobile station is actively exchanging packet data with the core network, since for each packet received from the core network, the home base station controller HBSC would have to access the database. A further problem with this solution is that the IMSI is not included in all LLC frames received from the core network. Therefore, the home base station controller HBSC 303 actively assigns packet service messages to the correct mobile station MS 1 or home base station HBS 301 using the temporary logical link identifier TLLI. Moreover, this mechanism is used only when the mobile station is actively exchanging packet service messages with the core network. This can be seen as equivalent to the period when the mobile station is in a GMM-READY state. This is illustrated in more detail in FIG. 3, which depicts the unlicensed-radio access network in more detail:

The unlicensed-radio access network depicted in FIG. 3 includes a home base station controller HBSC 303 connected via a fixed broadband network 302 to two access points or home base stations HBS1 and HBS2 301. The unlicensed-radio coverage areas 304 of each home base station is depicted by a dashed-dotted line. These coverage areas 304 will be referred to as mini-cells hereafter to distinguish them from cells of a conventional GMS network. Three mobile stations MS1-MS3 1 are located in the mini-cells 304 of these home base station controllers HBS 301. The home base station controller HBSC 303 is connected to a GPRS support node SGSN 200. The remaining elements of a conventional cellular core network 20 are omitted from the figure.

The home base station controller HBSC 303 in FIG. 3 comprises a packet control unit 3032 and a database 3031 illustrated schematically as a table in the figure accessible by the packet control unit 3032. The packet control unit is a processor for handling GPRS. The database 3031 is used to store the mobile station temporary identifier assigned to a mobile station by the core network. This identifier is preferably the logical link identifier TLLI assigned to a mobile station by the core network. In any event, the identifier must be the same or at least indicative of the temporary identification assigned by the core network 20 for a mobile station MS 1 and contained in each LCC frame exchanged between a mobile station and the core network 20. As mentioned above, the International Mobile Subscriber Identity IMSI is not suitable as an identifier. The IMSI, while useful for identifying paging messages from the core network 20, is not always available to the packet control unit from in a downlink LLC frame received from the core network.

In this database 3031 the mobile station temporary identifier is coupled with packet path information for the mobile station 1. When the home base stations HBS 301 are independent entities within the unlicensed-radio access network 30 that are able to establish a connection with a mobile station 1 and with the home base station controller HBSC 303 independently, the packet path information will be the packet path to the home base station controlling the mini-cell 304 the mobile station is currently located in. This is illustrated by way of example in FIG. 3, wherein the database contains TLLI values, TLLI-a to TLLI-c, associated with information identifying the home base station HBS 301, HBS1 or HBS2. The packet path information may be an identifier assigned to this home base station HBS 301 or it may indicate the network address (e.g. IP address and UDP port) of a packet path for this home base station HBS on the fixed broadband network 302. Naturally, when the home base station is a transparent access point, the temporary mobile station identifier will be mapped to the packet path or network address (IP address and UDP port of the mobile station 1 itself.

By way of example, mobile station MS 1 is located in the mini-cell of home base station 1. Consequently, the TLLI assigned to this mobile station MS1, TLLI-a is mapped to the packet path IP-address of home base station HBS1 in the home base station controller database 3031. Similarly, the TLLI of mobile station MS2, TLLI-b is mapped to home base station HBS1 and the TLLI of mobile station MS3, TLLI-c is mapped to home base station HBS2.

The database 3031 is used by the packet control unit 3032 in the following manner. When a downlink LLC frame is received from the core network (i.e. on the BSSGP-protocol layer), a TLLI value is also received. The packet control unit 3032 performs a database lookup using the received TLLI value as the search key. This lookup returns the mobile station packet path for this mobile station and the packet control unit 3032 forwards the received LLC frame to that destination.

As a result of the small size of the coverage areas of each home base station HBS 301 the number of mini-cells within a Routing Area under the control of a single home base station controller HBSC 303 may number thousands. Moreover, this number may change constantly as a consequence of the ease with which the home base stations HBS 301 can be added or removed from the unlicensed-radio access network 30.

Enabling the home base station controller HBSC 303 to direct LLC frames to the particular home base station HBS 301 in contact with a mobile station MS 1 thus means that the amount of signalling that would otherwise be required between the home base station controller HIBSC 303 and all home base stations HBS 301 is greatly reduced. In addition, performing an additional layer of mobility management at the home base station controller 303 means that the unlicensed-radio access network need not emulate the temporary block flow mechanism used in a conventional GSM access network, but can identify the mobile station in both downlink and uplink LLC frames during a period of intense packet traffic exchange.

In order to limit the size of the database 3031, a temporary mobile station identifier is held in the database only for the period that the mobile station is actively sending LLC frames. This corresponds essentially to the period within which a mobile station is in the GMM-READY state.

Figure 6:
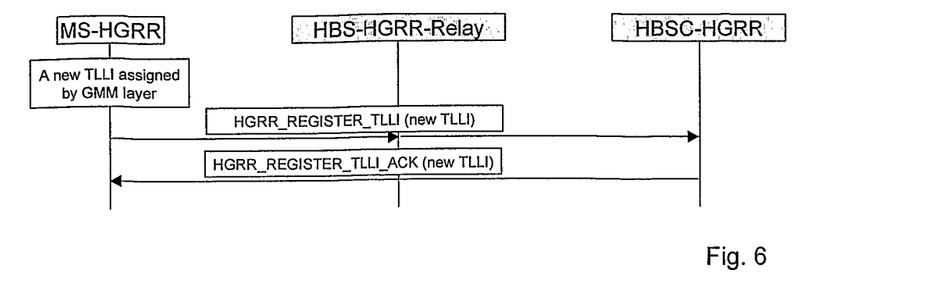
FIGS. 6 to 9 show signalling between a mobile station and an access controller of the unlicensed radio access network.

A new entry is created in the database 3031 by the packet control unit 3032 when an LLC frame, that is not empty, is received from the mobile station. The temporary mobile station identifier or TLLI is contained in the LLC frame. Alternatively, an entry can be registered by implementing a procedure in the mobile station. This is illustrated in FIG. 6. Specifically when the GPRS mobility management layer GMM is assigned a new P-TMSI, it assigns the derived temporary mobile station identifier or TLLI to both the logical link control LLC and home GPRS radio resource layer HGRR. The HGRR layer in the mobile station sends a signalling message "HGRR_REGISTER_TLLI (new TLLI)" to the home base station controller HBSC to register the new TLLI value. The home base station controller HBSC registers the TLLI entry with the packet path to the associated home base station, or to the mobile station directly, and returns and acknowledgement message "HGRR_REGISTER_TLLI_ACK".

A temporary mobile station identifier TLLI is changed when the serving GPRS service node SGSN indicates that a change should be made. This is registered in a similar fashion to that shown in FIG. 6. In this case the registration message contains both the new and the old TLLI. Upon receiving the new TLLI value the old TLLI entry can be deleted.

This register procedure can be performed by the mobile station each time there is an uplink LLC frame to be sent with a newly assigned TLLI.

Figure 7:
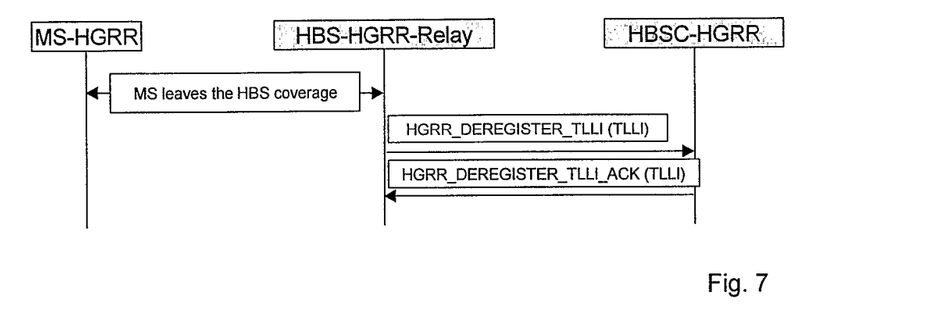

For removal of the temporary mobile station identifier from the database 3031 a number of possibilities exist. FIG. 7 illustrates a procedure carried out by the home base station HBS. When the mobile station leaves the coverage area of a home base station HBS, this is signalled to the home base station HBS. The HGRR layer in the home base station can then inform the home base station controller HBSC that the temporary mobile station identifier entry in the database 3031 is no longer valid by sending a de-register message "HGRR_DEREGISTER_TLLI". This is acknowledged by the home base station controller HBSC with a further message "HGRR_DEREGISTER_TLLI_ACK".

The de-registration procedure illustrated in FIG. 7 can obviously not be implemented in an unlicensed-radio access network using transparent access points as illustrated in FIG. 5, since the home base station HBS is not capable of recognising when a mobile station has left its coverage area, or of signalling this fact to the home base station controller HBSC. Moreover, since periods of intense packet exchange are still relatively short, it will be more common for this level of traffic to cease while a mobile station is within the coverage area of a mini-cell 304 then as a result of it leaving a mini-cell. The protocol stack of the mobile station MS 1 can be modified so that the lower layers, specifically the logical link control LLC layer is informed by the GMM layer when the GMM-READY state has switched to a GMM-STANDBY state. The mobile station can then inform the home base station controller of this change of state in using an LLC message. The TLLI entry in the database 3031 associated with this mobile station can then be removed since intense traffic flow will have ceased.

Figure 8:
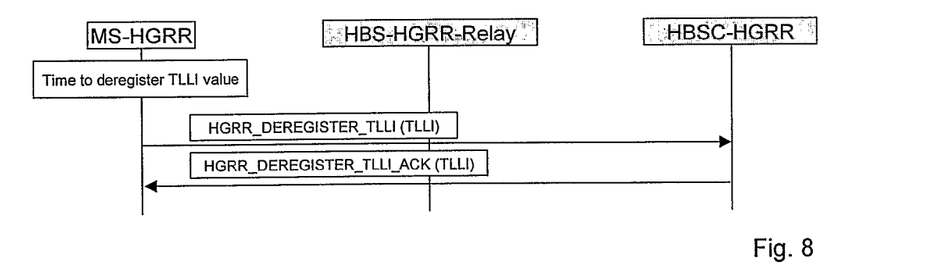
Figure 9:
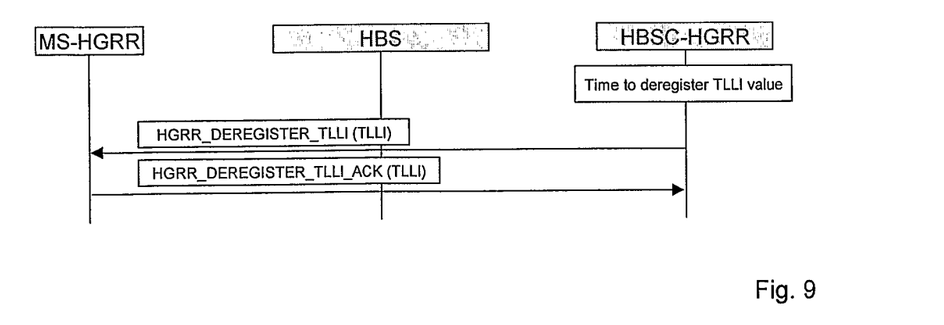

In order to enable the unlicensed access network 30 to control the updating of the database without modification of the protocol stack of the mobile station a timer is implemented in the home base station controller HBSC and accessible by the packet control unit 3032 or in the mobile station. This timer is started or reset when an LLC frame containing data is sent or received from the mobile station. Optionally it may also be restarted when an LLC frame is transmitted to the mobile station. When the timer has timed out, the associated temporary mobile station identifier entry is removed from the database 3131. The duration of this timer preferably reflects the duration of the timer defining the GMM-READY state in the mobile station. This value is defined also in the serving GPRS service node SGSN and is communicated to the mobile station. The database timer can thus be configured to have the same value as the GMM-READY state timer. A similar timer can be implemented in the mobile station. FIG. 8 illustrates the case when the timer is implemented in the mobile station; When the timer has timed out the mobile station sends a TLLI de-registration message "HGRR_DEREGISTRATION_TLLI" to the home base station controller HBSC. The home base station acknowledges the message with a further message "HGRR_DEREGISTRATION_TLLI_ACK" and deletes the corresponding TLLI entry in the database 3031. In FIG. 9, the same procedure occurs, but is initiated by the home base station controller HBSC.

When the unlicensed-radio access network is implemented using transparent access points as illustrated in FIG. 5, the mechanisms described above and illustrated in FIGS. 6, 8 and 9 can also be used. However, the access point HBS is also not able to communicate to the access network when a mobile station has left its coverage area. The signalling illustrated in FIG. 7 is thus not possible. As an alternative to implementing a timer in the home base station controller HBSC, the home base station can monitor the static connection with the mobile station and operate a connection maintenance mechanism. Specifically, the connection, which is preferably a static TCP connection, is maintained by the exchange of keep alive messages. If the home base station detects that a connection maintenance message has not been received recently, it can delete the TLLI entry from the database.

While the packet control unit 3032 has been described above as a single central processor, the routing of GPRS or a similar packet service can be simplified still further by implementing the packet control unit as a number of loosely coupled devices. Specifically, although the access points or home base stations HBS can present different cell identifiers to mobile stations a home base station controller HBSC can present only a few base station subsystem packet layer BSSGP virtual circuit identifiers BVCIs to the core network (SGSN). Each BVCI can then be controlled by a packet control unit portion and the TLLI database 3031 can likewise be divided up into several parts for each processing device. The packet control unit can then present one or more unique BVCIs for each processing device to the core network. This enables the packet control unit to more easily route downlink LLC frames to the dedicated processing device part handling the addressed mobile station.

The invention claimed is:

1. An unlicensed-radio access network connected to a packet service node in a core network portion of a licensed mobile network, said unlicensed-radio access network comprising:
   an access controller connected to said core network portion and having a packet controller,
   a fixed broadband network connected to said access controller and having a plurality of access points,
   each said access point defining a mini-cell coverage area and supporting an unlicensed-radio interface permitting communication of packet data between mobile stations located within a respective mini-cell and said access controller,
   wherein said access controller comprises a database configured to store temporary identification information assigned to mobile stations for use in packet service messages in association with packet path information addressing said mobile station on said fixed broadband network, and
   wherein said access controller is configured to receive from said core network portion multiple packet data messages each containing said temporary identification information of a mobile station located in the associated location area, to retrieve the packet path address associated with said identified mobile station, and to transmit each said packet data message to said identified packet path address.

2. An access network as claimed in claim 1, wherein said database is configured to store the identification of mobile stations in association with at least one specific access point for the coverage area in which said mobile station is located.

3. An access network as claimed in claim 1, wherein said access controller is configured to receive from a mobile station a message registering temporary identification information for said mobile station and to store said new temporary identification information data in said database in association with packet path address information for said mobile station on said fixed broadband network.

4. An access network as claimed in claim 1, wherein said mobile station temporary identification information is the temporary logical link identifier (TLLI).

5. An access network as claimed in claim 1, wherein said packet path address information is a network address of said access points on said fixed broadband network.

6. An access network as claimed in claim 5, wherein said packet path address information is assigned to an access point communicating with said mobile station.

7. An access network as claimed in claim 1, wherein said access controller is configured to delete said temporary identification information on receipt of a message from at least one of said access point and said mobile station that said stored temporary identification information is no longer valid.

8. An access network as claimed in claim 1, wherein said access network controller is configured to determine whether a connection with said mobile station is maintained and to delete said temporary identification information from said database on determining that said connection is no longer maintained.

9. An access network as claimed in claim 8, wherein said access controller comprises a timer with a predetermined count duration and configured to restart upon receipt of a packet data message from said mobile station containing a stored temporary identification information, said packet controller being arranged to delete the mobile station identification when said timer has terminated its count duration.

10. A method in an unlicensed-radio access network comprising a plurality of access points adapted to communicate with mobile stations over an unlicensed-radio interface and an access controller connected to said access points and to a packet service node in a core network portion of a licensed-radio cellular network, said method including the steps of:
   receiving from a mobile station a temporary logical link identifier (TLLI) for use in packet service messages specific to said mobile station,
   registering said temporary logical link identifier in said access controller in association with packet path information identifying at least one access point,
   receiving in said access controller a packet service message from said core network portion addressing a mobile station,
   retrieving said temporary logical link identifier from said packet service message;
   identifying a packet path address to at least one access point for said addressed mobile station, and
   forwarding said packet service message to the at least one access point identified in association with said registered temporary logical link identifier.

11. A method as claimed in claim 10, further comprising:
   updating said temporary logical link identifier on receipt of a message from the access point identified in association with said temporary logical link identifier that said temporary logical link identifier is no longer valid.

12. A method in an unlicensed-radio access network comprising a plurality of access points adapted to communicate with mobile stations over an Unlicensed-radio interface and an access controller connected to said access points and to a packet service node in a core network portion of a licensed-radio cellular network, said method including the steps of:
   receiving from a mobile station a temporary logical link identifier (TLLI) for use in packet service messages specific to said mobile station,
   registering said temporary logical link identifier in said access controller in association with packet path information identifying at least one access point,
   setting a timer on receipt from a mobile station of a packet service message containing a stored temporary logical link identifier,
   resetting said timer if a further packet service message containing said stored temporary logical link identifier is received from said mobile station within a predetermined time delay, and
   deleting said temporary logical link identifier registered for said mobile station if no further packet service message containing said stored temporary logical link identifier is received from said mobile station within said predetermined time delay.

13. A method in an unlicensed-radio access network comprising a fixed broadband network with plurality of access points, and an access controller connected to said fixed broadband network and to a packet service node of a core network portion of a licensed-radio cellular network, the access controller configured to exchange packet service messages with mobile stations over an unlicensed-radio interface via said access points, said method including the steps of:
   said access controller establishing communication with a mobile station using a network address on said fixed broadband network for said mobile station,
   receiving temporary identification information for use in packet service messages specific to a mobile station from said mobile station, registering said mobile station identification information in association with a network address on said fixed broadband network specific to said mobile station, retrieving said temporary identification information from a packet data message received from said core network, and directing said packet data message to said network address stored in association with said temporary identification information.

14. A method as claimed in claim 13, further comprising the step of:

said access controller determining when a connection established with said mobile station is no longer maintained and deleting said mobile station identification information when it is determined that a connection is no longer maintained.

15. A method as claimed in claim 13, further comprising:

setting a timer on receipt of a packet service message containing stored temporary identification information from a mobile station, resetting said timer if a further packet service message containing said stored temporary identification information is received from said mobile station within a predetermined time delay, and deleting said mobile station identification information registered for said mobile station if no further packet service message containing said stored temporary identification information is received from said mobile station within said predetermined time delay.

16. An access controller for forming part of an unlicensed-radio access network and for controlling access to the core network portion of a licensed mobile network, said access controller being configured to connect to said core network portion and to a broadband network that has a plurality of access points, each said access point defining a mini-cell coverage area and supporting an unlicensed-radio interface permitting communication of packet data between mobile stations located within a respective mini-cell and said access controller, said access controller further including a packet controller, wherein said access controller comprises a database for storing temporary identification information assigned to mobile stations for use in packet service messages in association with packet path information addressing said mobile station on said fixed broadband network, and wherein said access controller is further configured to:

retrieve said temporary identification information from each of multiple packet data messages received from said core network, and direct each said packet data message to a mobile station at said network address stored in association with said temporary identification information.

17. An access controller as claimed in claim 16, wherein said access controller is further configured to receive from a mobile station a message registering temporary identification information for said mobile station and to store said new temporary identification information data in said database in association with packet path address information for said mobile station on said fixed broadband network.

18. An access controller as claimed in claim 16, wherein said mobile station temporary identification information is the temporary logical link identifier (TLLI).

19. An access controller as claimed in claim 16, wherein said access controller is further configured to delete said temporary identification information on receipt of a message from said mobile station that said stored temporary identification information is no longer valid.

20. An access controller as claimed in claim 16, wherein said access controller is configured to determine whether a connection with said mobile station is maintained and to delete said temporary identification information from said database on determining that said connection is no longer maintained.

* * * * *

UNITED STATES PATENT AND TRADEMARK OFFICE
CERTIFICATE OF CORRECTION

PATENT NO. : 8,320,300 B2  Page 1 of 1
APPLICATION NO. : 10/592317
DATED : November 27, 2012
INVENTOR(S) : Nylander et al.

It is certified that error appears in the above-identified patent and that said Letters Patent is hereby corrected as shown below:

In the Specifications:

In Column 9, Line 2, delete "HIBSC" and insert -- HBSC --, therefor.

In Column 10, Line 25, delete "station;" and insert -- station. --, therefor.

In the Claims:

In Column 12, Line 31, in Claim 12, delete "Unlicensed-radio" and insert -- unlicensed-radio --, therefor.

Signed and Sealed this
Eighteenth Day of June, 2013

Teresa Stanek Rea
*Acting Director of the United States Patent and Trademark Office*